US009466326B2

(12) United States Patent
Yu et al.

(10) Patent No.: US 9,466,326 B2
(45) Date of Patent: Oct. 11, 2016

(54) HOLOGRAPHIC STORAGE DISK AND HOLOGRAPHIC STORAGE SYSTEM

(71) Applicant: National Central University, Taoyuan (TW)

(72) Inventors: Yeh-Wei Yu, Taoyuan (TW); Ching-Cherng Sun, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 15/011,627

(22) Filed: Jan. 31, 2016

(65) Prior Publication Data
US 2016/0225401 A1 Aug. 4, 2016

Related U.S. Application Data

(60) Provisional application No. 62/109,633, filed on Jan. 30, 2015.

(30) Foreign Application Priority Data

Sep. 18, 2015 (TW) .............................. 104130980 A

(51) Int. Cl.
G11B 7/00 (2006.01)
G11B 7/24085 (2013.01)
(Continued)

(52) U.S. Cl.
CPC ......... *G11B 7/24085* (2013.01); *G11B 7/0065* (2013.01); *G11B 2007/240025* (2013.01)

(58) Field of Classification Search
CPC .................... G11B 7/1353; G11B 2007/0006; G11B 7/0065; G11B 7/083; G11B 7/24; G11B 7/24085; G11B 7/131

USPC ......... 369/103, 109.1, 110.3, 112.03, 112.1, 369/112.15

See application file for complete search history.

(56) References Cited

U.S. PATENT DOCUMENTS

| 5,062,098 A | 10/1991 | Hori et al. |
| 5,541,888 A | 7/1996 | Russell |
| 5,737,296 A | 4/1998 | Komma et al. |

(Continued)

FOREIGN PATENT DOCUMENTS

| EP | 1764796 A2 | 3/2007 |
| EP | 2390731 B1 | 10/2012 |

(Continued)

OTHER PUBLICATIONS

H. J. Coufal et al., "Holographic Data Storage", Springer-Verlag Berlin Heidelberg GmbH, New York, Softcover reprint of the hardcover first edition, 2000.

(Continued)

*Primary Examiner* — Nabil Hindi
(74) *Attorney, Agent, or Firm* — CKC & Partners Co., Ltd.

(57) ABSTRACT

A holographic storage disk includes a reflective layer, a storage layer, and quarter-wave plate. A storage layer is disposed on the reflective layer and includes a reflection-structure layer and photosensitive units. The reflection-structure layer has cavities, in which the reflection-structure layer is grid-shaped. The cavities penetrate the reflection-structure layer. The photosensitive units are disposed in the cavities. The quarter-wave plate is disposed between the reflective layer and the photosensitive units.

20 Claims, 13 Drawing Sheets

(51) Int. Cl.
*G11B 7/0065* (2006.01)
*G11B 7/24* (2013.01)

(56) References Cited

U.S. PATENT DOCUMENTS

| | | | |
|---|---|---|---|
| 7,085,026 B2 | 8/2006 | Horimai | |
| 7,889,615 B2 | 2/2011 | Worthington et al. | |
| 8,026,046 B2 * | 9/2011 | Abe .................. | G11B 7/007 369/275.4 |
| 2004/0165518 A1 | 8/2004 | Horimai et al. | |
| 2009/0135702 A1 | 5/2009 | Usami et al. | |

FOREIGN PATENT DOCUMENTS

| | | |
|---|---|---|
| TW | I420519 B | 12/2013 |
| WO | 0247071 A2 | 6/2002 |
| WO | 2006061726 A1 | 6/2006 |

OTHER PUBLICATIONS

Lambertus Hesselink et al., "Holographic Data Storage Systems", Proceedings of the IEEE, vol. 92, No. 8, Aug. 2004, pp. 1231-1280.
Kevin Curtis, et al., "Holographic Data Storage: From Theory to Practical Systems", John Wiley & Sons Ltd., this edition first published in 2010.
Ken Anderson et al., "Polytopic multiplexing", Optics Letters, vol. 29, No. 12, Jun. 15, 2004, pp. 1402-1404.
Ken Anderson et al., "High-speed holographic data storage at 500 Gbits/in.2," Motion Imaging Journal, SMPTE, vol. 115, Issues 5-6, pp. 200-203, 2006.

* cited by examiner

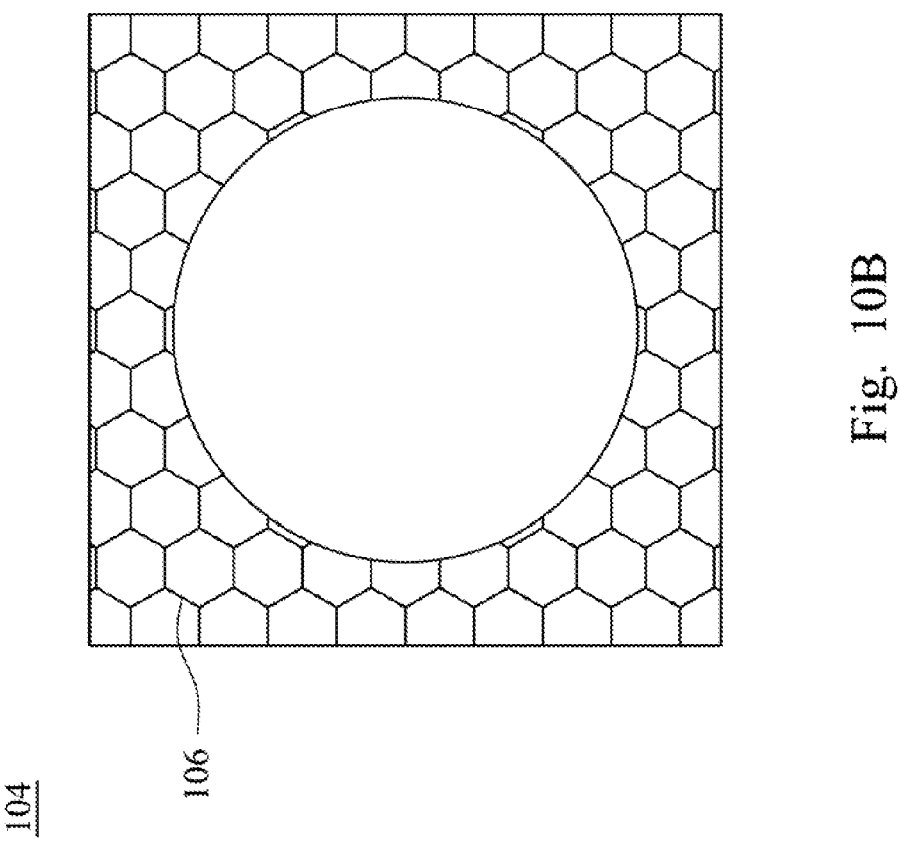

HOLOGRAPHIC STORAGE DISK AND HOLOGRAPHIC STORAGE SYSTEM

RELATED APPLICATIONS

This application claims the priority benefit of U.S. provisional application No. 62/109,633, filed on Jan. 30, 2015, and Taiwanese application No. 104130980, filed on Sep. 18, 2015. The entirety of the above-mentioned patent applications are hereby incorporated by reference herein and made a part of specification.

BACKGROUND

1. Technical Field

The present disclosure relates to a holographic storage disk and a holographic storage system.

2. Description of Related Art

As technology has developed, the amount of storage capacity required for electronic files has correspondingly increased. A typical way of storing data involves recording magnetic or optical changes on the surface of a recording medium, and the magnetic or optical changes are taken as the basis of the data. Examples of such recording mediums include floppy disks and compact discs. However, as the amount of storage capacity required for electronic files increases, the development of holographic storage technology has been attracting the attention of those in the field.

With holographic storage technology, image data can be written into a recording medium (a photosensitive medium) via interference between a signal light beam and a reference light beam. When reading the image data, the image data can be generated by emitting the reference light beam into the recording medium (photosensitive medium) again. Next, the image data is generated, and the generated image data can be read by a detector. In other words, the storage capacity of holographic storage technology is related to the recording medium (photosensitive medium).

SUMMARY

An aspect of the present invention provides a holographic storage disk including a storage layer and a quarter-wave plate. The storage layer includes a reflection-structure layer, in which the reflection-structure layer includes cavities for confining a diffusion area with respect of a writing light beam. Therefore, when data is written into the storage layer, the writing light beam formed by a reference light beam and a signal light beam is confined in a region defined by the cavities, such that the degree of mixing between the reference light beam and the signal light beam is enhanced, thereby increasing a usage rate of photosensitive material disposed in the cavities. Furthermore, the quarter-wave plate is disposed to reduce the noise generated in a loading operation of the holographic storage disk.

An aspect of the present invention provides a holographic storage disk including a reflective layer, a storage layer, and a quarter-wave plate. A storage layer is disposed on the reflective layer and includes a reflection-structure layer and photosensitive units. The reflection-structure layer has cavities, in which the reflection-structure layer is grid-shaped. The cavities penetrate the reflection-structure layer. The photosensitive units are disposed in the cavities. The quarter-wave plate to is disposed between the reflective layer and the photosensitive units.

In some embodiments, the quarter-wave plate is present between the reflective layer and the reflection-structure layer.

In some embodiments, the quarter-wave plate is present in the cavities of the reflection-structure layer.

In some embodiments, the holographic, storage disk further includes an azo-dye layer. The azo-dye layer is disposed between the quarter-wave plate and the photosensitive units, in which the azo-dye layer is opposite to the reflective layer.

In some embodiments, the holographic storage disk further includes a liquid-crystal layer and an orientation layer. The liquid-crystal layer and the orientation layer are disposed between the quarter-wave plate and the photosensitive units, in which the liquid-crystal layer is present between the orientation layer and the quarter-wave plate.

In some embodiments, a shape of the orientation layer viewed in a direction normal to the orientation layer is circular, and the orientation layer has orientation directions arranged as concentric circles to allow at least one liquid crystal in the liquid-crystal layer to be arranged along at least one tangent direction of the concentric circles.

In some embodiments, the liquid-crystal layer includes at least one of a thermotropic liquid crystal polymer and a lyotropic liquid crystal polymer.

An aspect of the present invention provides a holographic storage system including a holographic storage disk, a holographic light-source module, a spatial light modulator (SLM), a light-splitting module, an object lens, a receiver, and a filter. The holographic storage disk includes a storage layer, in which the storage layer includes a reflection-structure layer and photosensitive units. The reflection-structure layer has cavities, in which the reflection-structure layer is grid-shaped. The cavities penetrate the reflection-structure layer. The photosensitive units are disposed in the cavities. The holographic light-source module is configured to provide a signal light beam and a reference light beam. The SLM is configured to receive the signal light beam and the reference light beam provided by the holographic light-source module and to modulate the signal light beam and the reference light beam. The signal light beam and the reference light beam modulated by the SLM are propagated toward the holographic storage disk via the light-splitting module and the object lens. The receiver is configured to receive the reference light beam reflected form the holographic storage disk. The filter is disposed in an optical path of the reference light beam. The filter is grid-shaped, and each of the grids of the filter and each of the grids of the reflection-structure layer have the same shape.

In some embodiments, the filter is made of a light absorbing material.

In some embodiments, the filter is disposed at a position corresponding to an optical conjugate position of the holographic storage disk facing a surface of the object lens.

In some embodiments, the holographic storage system further includes an actuator connected to the filter.

In some embodiments, the filter is disposed at a position which is correspondingly present between the SLM and the objective lens in the optical path of the reference light beam.

In some embodiments, the filter is disposed at a position which is correspondingly present between the holographic storage disk and the receiver in the optical path of the reference light beam.

In some embodiments, an incident surface of the reference light beam passing through the filter has a block zone. The boundary of the block zone corresponds to the grid-shape of the reflection-structure layer, in which the position of the filter makes an area of the block zone be in a range from one half to double of the area of the grid-shape of the reflection-structure layer.

In some embodiments, the holographic storage disk further includes a first substrate and a second substrate. The storage layer is present between the first substrate and the second substrate. The first substrate and the object lens are present at the same side of the storage layer. Each of the first substrate and the second substrate is a transparent substrate.

In some embodiments, the holographic storage disk further comprise first substrate and a second substrate. The storage layer is present between the first substrate and the second substrate. The first substrate and the object lens are present at the same side of the storage layer. The first substrate is a transparent substrate, and the second substrate is a reflective substrate.

An aspect of the present invention provides a holographic storage system including a holographic storage disk, a holographic light-source module, an SEM, a light-splitting module, and an object lens. The holographic storage disk includes a storage layer, in which the storage layer includes a reflection-structure layer and photosensitive units. The reflection-structure layer has cavities. The reflection-structure layer is grid-shaped, and the cavities penetrate the reflection-structure layer. The photosensitive units are disposed in the cavities. The holographic light-source module is configured to provide a signal light beam and a reference light beam. The SLM is configured to receive the signal light beam and the reference light beam provided by the holographic light-source module and to modulate the signal light beam and the reference light beam, in which the SLM has a block pattern configured to block the modulated reference light beam to allow an incident surface of the modulated reference light beam to be grid-shaped, and each of the grids of the reference light beam and each of the grids of the reflection-structure layer have the same shape. The signal light beam and the reference light beam modulated by the SLM are propagated toward the holographic storage disk via the light-splitting module and the object lens.

In some embodiments, the reference light beam is modulated to have a block zone. The boundary of the block zone corresponds to the grid-shape of the reflection-structure layer, and the position of the SLM makes an area of the block zone be in a range from one half to double of the area of the grid-shape of the reflection-structure layer.

BRIEF DESCRIPTION OF THE DRAWINGS

FIG. 10B is a front view of a spatial light modulator (SLM) illustrated in FIG. 10A.

DETAILED DESCRIPTION

Figure 1A:
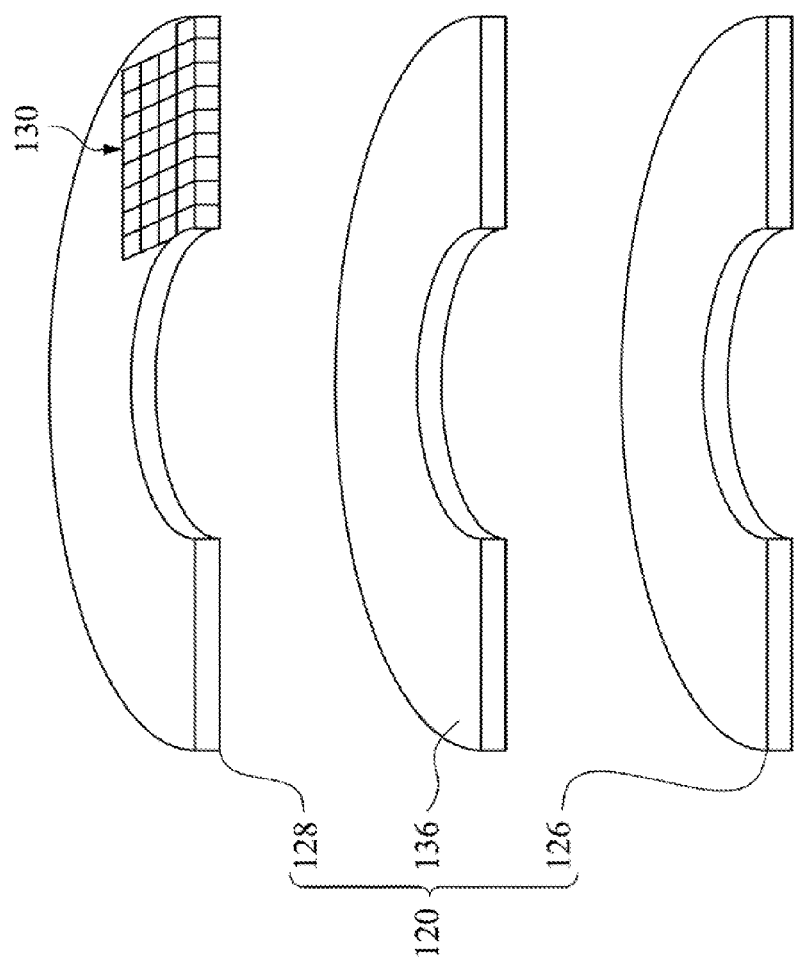
FIG. 1A is an exploded perspective view of a holographic storage disk according to the first embodiment of this invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a holographic storage system, when data is written into a holographic storage disk, a writing light beam formed by a signal light beam and a reference light beam is required to perform exposure and interference in a certain area of a photosensitive unit. However, in the photosensitive unit, since the actual area used for storing data is smaller than the exposed area, parts of the photosensitive unit are not utilized, and hence the usage rate of the photosensitive unit is decreased. Moreover, when the usage rate of the photosensitive material is decreased, the storage capacity of the holographic disk is reduced.

In view of this, a holographic storage disk of the present invention includes a reflection-structure layer having cavities, in which the cavities are configured to confine a diffusion area of a writing light beam. Therefore, the extent of mixing between a reference light beam and a signal light beam is enhanced, and the usage rate of the photosensitive material is increased. Moreover, since the usage rate of the photosensitive material is increased, the storage capacity of the holographic storage disk is also improved. In addition, the holographic storage disk includes a quarter-wave plate configured to reduce the noise generated in a loading operation of the holographic storage disk.

Figure 1B:
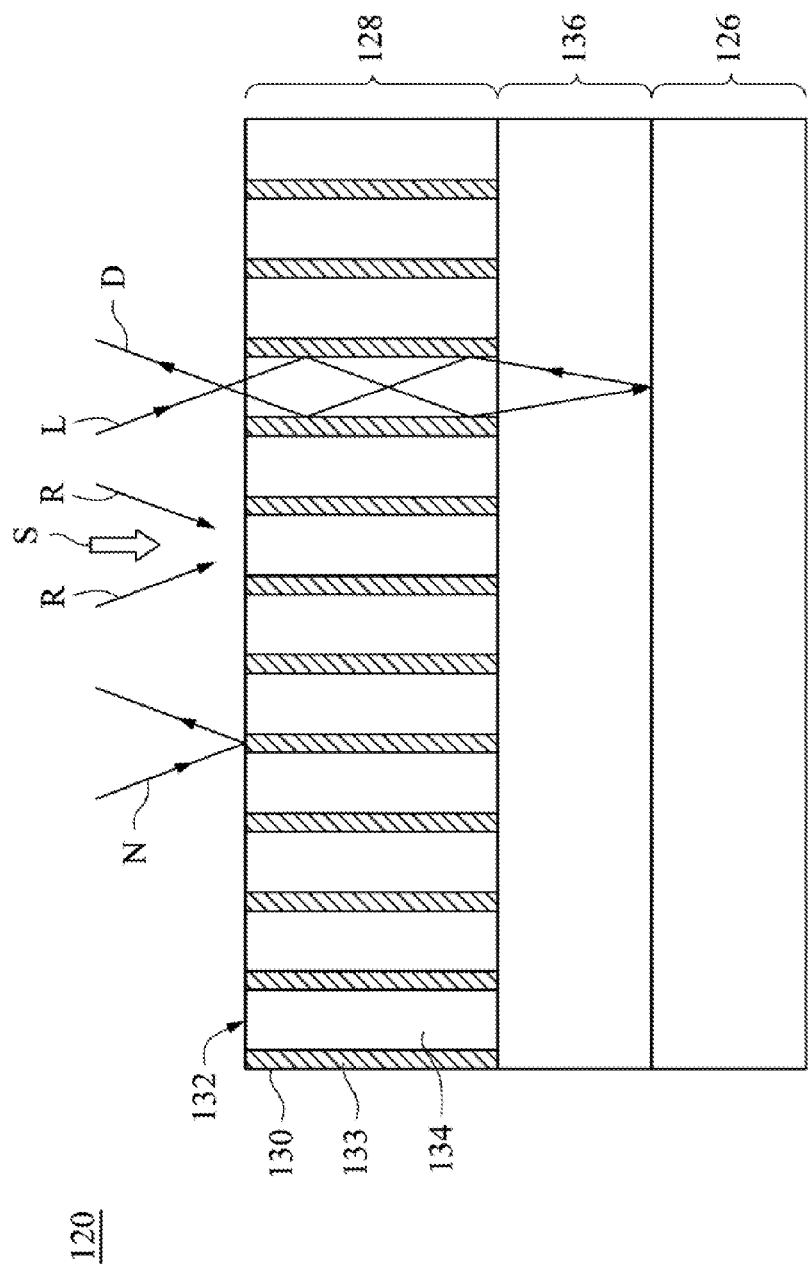
FIG. 1B a cross-sectional view of the holographic storage disk illustrated in FIG. 1A.

FIG. 1A is an exploded perspective view of a holographic storage disk 120 according to the first embodiment of this invention. FIG. 1B a cross-sectional view of the holographic storage disk 120 illustrated in FIG. 1A. As shown in FIGS. 1A and 1B, the holographic storage disk 120 includes a reflective layer 126, a storage layer 128 and a quarter-wave plate 136. A storage layer 128 is disposed on the reflective layer 136 and includes a reflection-structure layer 130 and photosensitive units 134. The reflection-structure layer 130 has cavities 132, in which the reflection-structure layer 130 is grid-shaped. The cavities 132 penetrate the reflection-structure layer 130. The photosensitive units 134 are disposed in the cavities 132. The quarter-wave plate 136 is disposed between the reflective layer 126 and the photosensitive units 134. In addition, for making the description succinct, only parts of the grid-shaped structure of the reflection-structure layer 130 are illustrated in FIG. 1A.

As shown in FIG. 1B, the reflective structure layer 130 includes sidewalls 133 to define the cavities 132, such that the photosensitive units 134 located in the cavities 132 are separated from each other by the sidewalls 133. The photosensitive units 134 can be made of an optical storage material or a photosensitive material. With this configuration, when a writing light beam formed by a signal light beam S and a reference light beam R enters one of the cavities 132, the writing light beam is reflected from the sidewalls 133 which define the cavity 132 to propagate within the cavity 132. In other words, the cavities 132 and the sidewalls 133 can be used for confining a diffusion area of the writing light beam to limit the writing light beam to be present within the single cavity 132.

For example, when a writing operation of the holographic storage disk 120 is performed, the writing light beam formed by the signal light beam S and the reference light beam R can enter the cavities 132, such that the photosensitive units 134 are interfered by the writing light beam. Since the writing light beam is confined to be present within at least one of the cavities 132, the extent of mixing between the signal light beam S and the reference light beam R is enhanced. Therefore, the usage rate of the photosensitive units 134 is increased, and the storage capacity of the holographic storage disk 120 is improved.

Furthermore, in the present embodiment, the quarter-wave plate 136 is present between the reflective layer 126 and the reflection-structure layer 130. The quarter-wave plate 136 is configured to cause a 180° phase difference between a light beam before entering the holographic storage disk 120 and the same light beam after leaving the holographic storage disk 120, so as to reduce the interference noise caused by the scattering of the light beam. Herein, the term "the interference noise caused by the scattering of the light beam" means that a light beam is probably reflected from a surface of the holographic disk 120 corresponding to at least one of the sidewalls 133 when the light beam is propagated toward the holographic storage disk 120 during a loading operation of the holographic storage disk 120. When the above situation occurs, the light beam reflected from at least one of the sidewalls 133 may become a scattered light beam, as the scattering light N marked in FIG. 1B.

During the loading operation of the holographic storage disk 120, such a scattered light beam becomes the interference noise with respect to a receiver (not illustrated), and hence distorted data may be generated by the receiver after the loading operation. Therefore, the quarter-wave plate 136 is disposed to distinguish diffracting light D from the scattering light N, in which the diffracting light D is a light beam which leaves the holographic storage disk 120 after being diffracted in the holographic storage disk 120, thereby preventing the receiver from generating the distorted data.

For example, the condition of the loading operation of the holographic storage disk 120 is set as that the holographic storage disk 120 receives a p-polarization loading light beam L. Under this condition, when a p-polarization loading light beam L enters the holographic storage disk 120, the loading light beam L may pass through the quarter-wave plate 136 located between the storage layer 128 and the reflective layer 126. Next, the loading light beam L is reflected form the reflective layer 126, and the reflective layer 126 becomes a diffracting light D after leaving the holographic storage disk 120 through the quarter-wave plate 136. Thus, the number of the times of passing through the quarter-wave plate 136 by the loading light beam L in the holographic storage disk 120 is two, and therefore there is a 180° phase difference between the loading light beam L and the diffracting light D. In other words, as the loading light beam L enters the holographic storage disk 120, it has p-polarization, and the diffracting light D leaving the holographic storage disk 120 has s-polarization. On the other hand, the scattering light N is generated by a part of the loading light beam L reflected from the surface of the holographic storage disk 120 corresponding to the sidewalls 133, in which this the scattering light N is kept to be in p-polarization. Therefore, there is a 180° phase difference between the diffracting light D and the scattering light N.

With this configuration, according to the distinguishability between the diffracting light D and the scattering light N, a holographic storage device (not illustrated) can selectably receive the diffracting light D due to this distinguishability, such that the reception of noise caused by the scattering light N may be prevented.

For example, in some embodiments, the receiver of the holographic storage device is an optical-signal receiver, and the holographic storage device includes a three-dimensional filter (not illustrated) and a polarizing filter (not illustrated) disposed in an optical path of the diffracting light D. The polarizing filter can be a linear polarizing plate or a polarizing splitter. The three-dimensional filter is configured to filter the scattering light N with a great angle. The polarizing filter is configured to filter the scattering light N according to the polarization of the scattering light N. Therefore, the optical-signal receiver can receive the diffracting light D and generate corresponding data under a condition in which the scattering light N is filtered.

As described above, in the present embodiment, with the reflection-structure layer 130 of the storage layer 128, the extent of mixing between the signal light beam S and the reference light beam R in the writing light beam can be enhanced, thereby improving the storage capacity of the holographic storage disk 120. Furthermore, with the disposition of the quarter-wave plate 136, since the diffracting light D can be distinguish from the scattering light N due to the distinguishability, the holographic storage device can selectably receive the diffracting light D due to the distinguishability, so as to prevent the generated data from being distorted.

Figure 2:
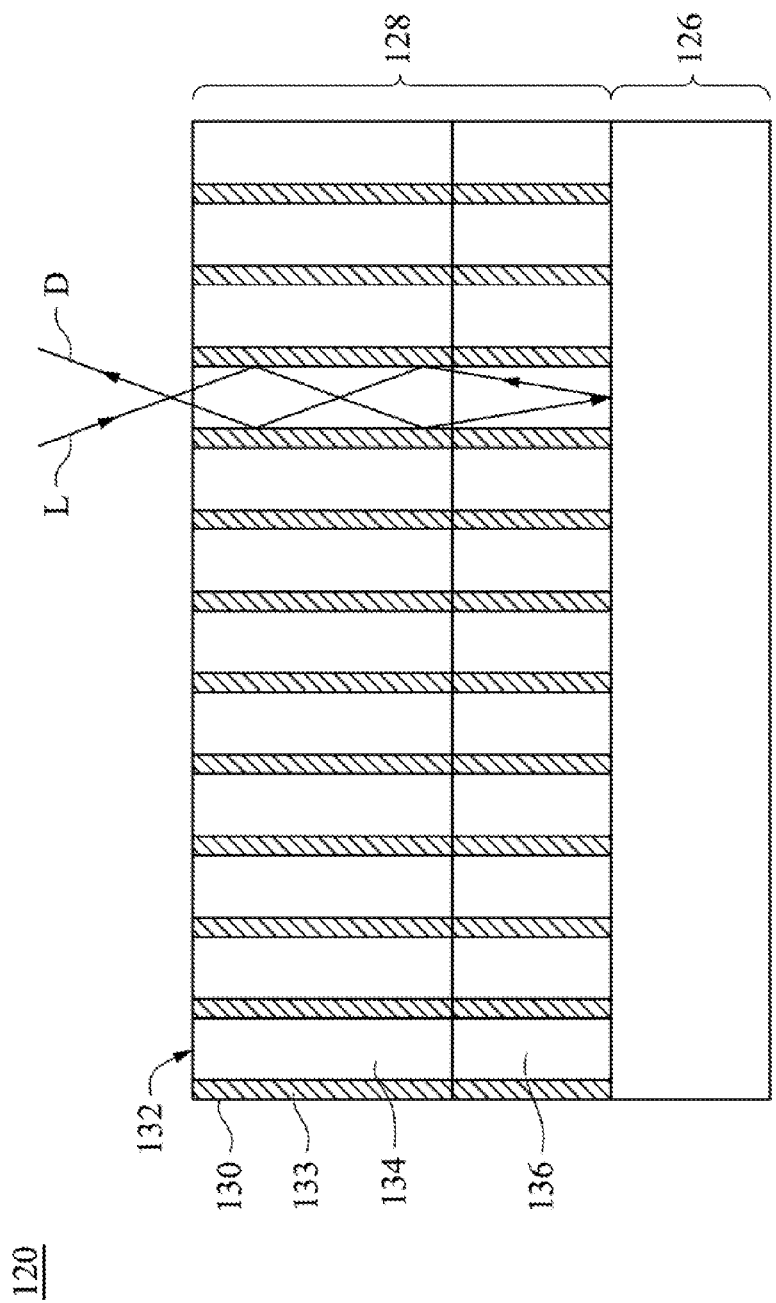
FIG. 2 is a cross-sectional view of a holographic storage disk according to the second embodiment of this invention.

FIG. 2 is a cross-sectional view of a holographic storage disk 120 according to the second embodiment of this invention. The difference between the present embodiment and the first embodiments is that the quarter-wave plate 136 is present in the cavities 132 of the reflection-structure layer 130.

As described previously, when the loading light beam L emitted toward the holographic storage disk 120 is reflected from the surface of the holographic storage disk 120 corresponding to the sidewalls 133, the scattering light N (see FIG. 1B) may be generated. Similarly, after the loading light beam L enters the holographic storage disk 120 and is reflected from the reflective layer 126, the loading light beam L may be reflected from the sidewalls 133 of the storage layer 128 facing the reflective layer 126. When the loading light beam L is reflected from the sidewalls 133 of the storage layer 128 facing the reflective layer 126, the loading light beam L is reflected back to the reflective layer 126. Next, whether this loading light beam L leaves the holographic storage disk 120 by being directly reflected from the reflective layer 126 or by being propagated between the storage layer 128 and the reactive layer 126 with multiple possible reflections, the loading light beam L may be received as interfering noise, in the loading operation of the holographic storage disk 120.

In the present embodiment, under a condition in which the quarter-wave plate 136 is present in the cavities 132 of the reflection-structure layer 130, when the loading light beam L travels from the photosensitive units 134 in the cavities 132 to the reflective layer 126 through the quarter-wave plate 136, the loading light beam L can leave the holographic storage disk 120 by being reflected from the same cavity 132 and become a diffracting light D. Therefore, with the configuration of the present embodiment, in the holographic storage disk 120, an unexpected-reflection situation with respect to the loading light beam L may be prevented.

Figure 3:
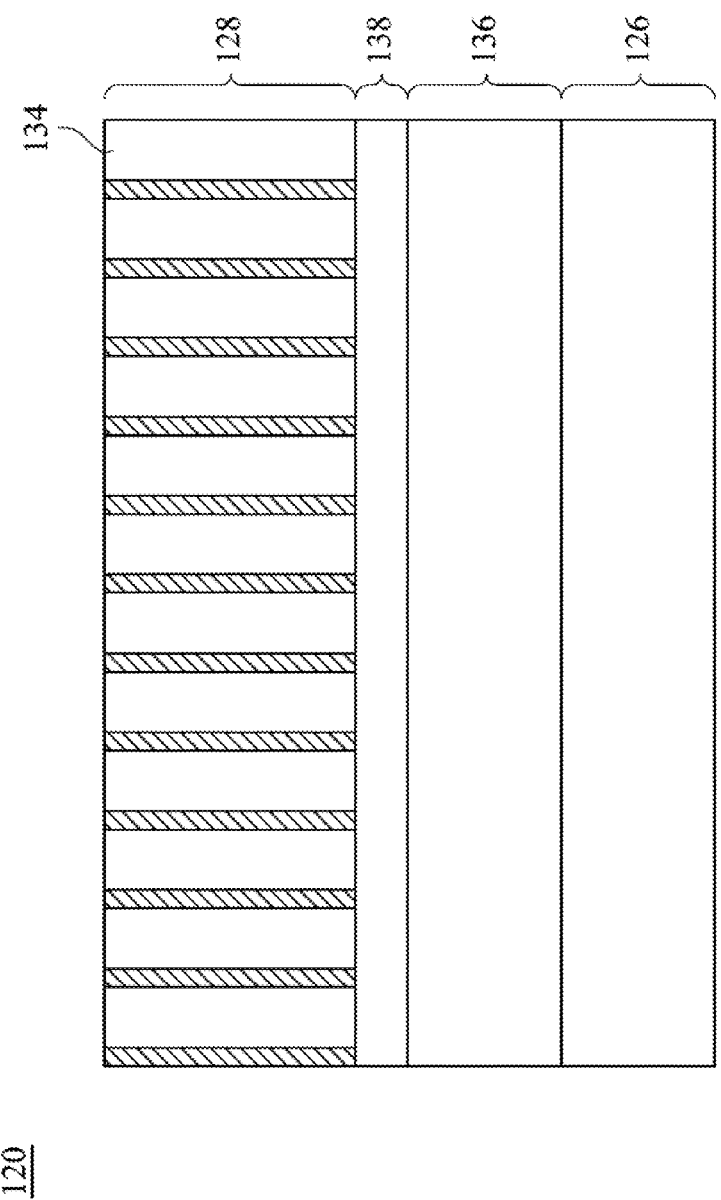
FIG. 3 is a cross-sectional view of a holographic storage disk according to the third embodiment of this invention.

FIG. 3 is a cross-sectional view of a holographic storage disk 120 according to the third embodiment of this invention. The difference between the present embodiment and the first embodiments is that the holographic storage disk 120 of the present embodiments further includes an azo-dye layer 138. The azo-dye layer 138 is disposed between the quarter-wave plate 136 and the photosensitive units 134 of the storage layer 128, in which the azo-dye layer 138 is opposite to the reflective layer 126.

Under a design with a proper incident angle, the quarter-wave plate 136 can provide a function that the polarization of the incident beam is transferred from linear polarization to circular polarization. However, since the holographic storage disk 120 under the loading operation has a rotating status, the incident angle of the loading light beam with respect to the holographic storage disk 120 is varied with the rotating of the holographic storage disk 120. In other words, under the rotating status of the holographic storage disk 120, an angle between a fast axis of the quarter-wave plate 136 and the direction of the polarization of the incident light is varied with the rotation of the holographic storage disk 120, such that the quarter-wave plate 136 cannot provide the function of transferring the polarization from the linear polarization to the circular polarization under some conditions. For example, the quarter-wave plate 136 may transfer the polarization from the linear polarization to a different linear polarization or elliptical polarization.

In the mechanism provided by the azo-dye layer 138, the bar-shaped azo-dye molecule has a property such that the azo-dye molecule can rotate to be orthogonal with the direction of the polarization of the incident light, such that the azo-dye layer 138 can generate anisotropy with respect to the incident light. In other words, in the present embodiment, with disposing the azo-dye layer 138, the angle between the fast axis of the quarter-wave plate 136 and the direction of the polarization of the incident light can be independent of the rotating status of the holographic storage disk 120.

Therefore, the angle between the fast axis of the quarter-wave plate 136 and the direction of the polarization of the incident light can be controlled through the azo-dye layer 138, such that the quarter-wave plate 136 can be kept to provide the function that the polarization of the incident beam is transferred from linear polarization to circular polarization. Furthermore, in some embodiments, the thickness of the azo-dye layer 138 can be varied according to the different incident angle.

Figure 4A:
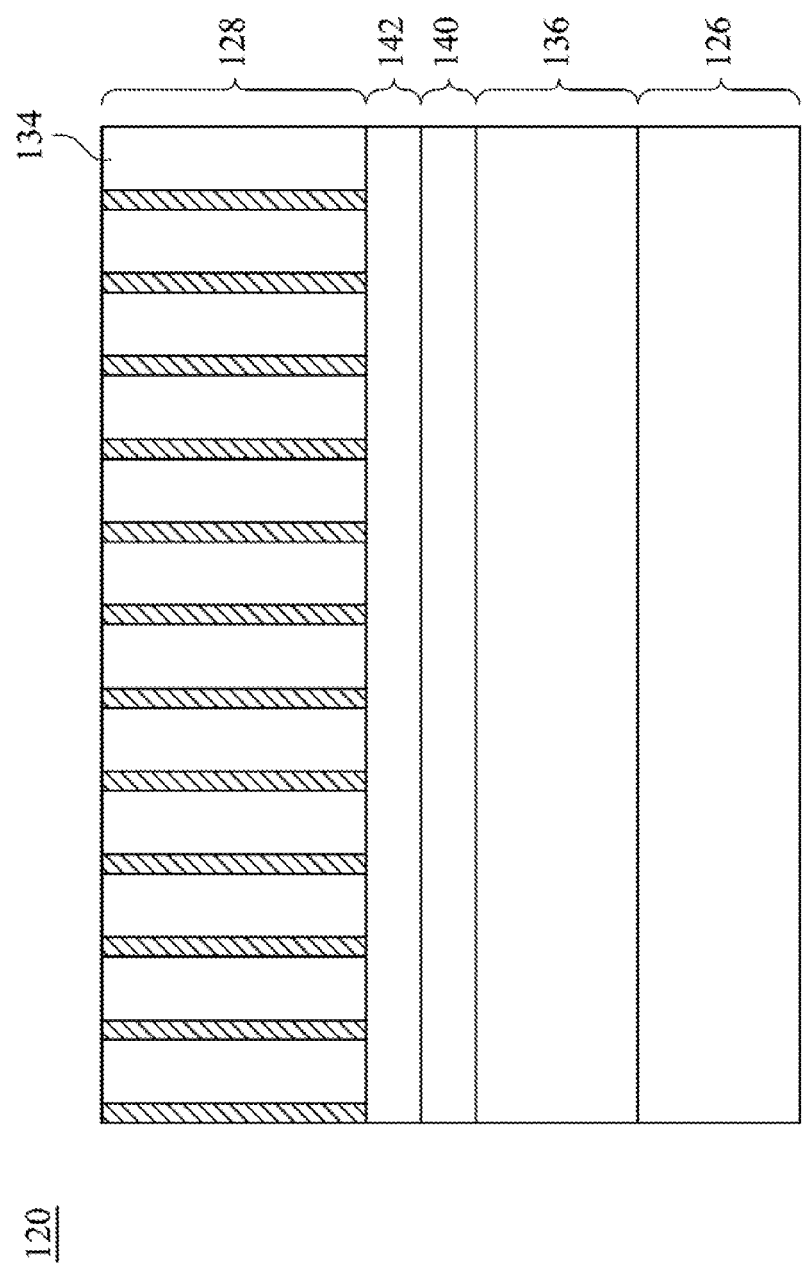
FIG. 4A is a cross-sectional view of a holographic storage disk according to the fourth embodiment of this invention.
Figure 4B:
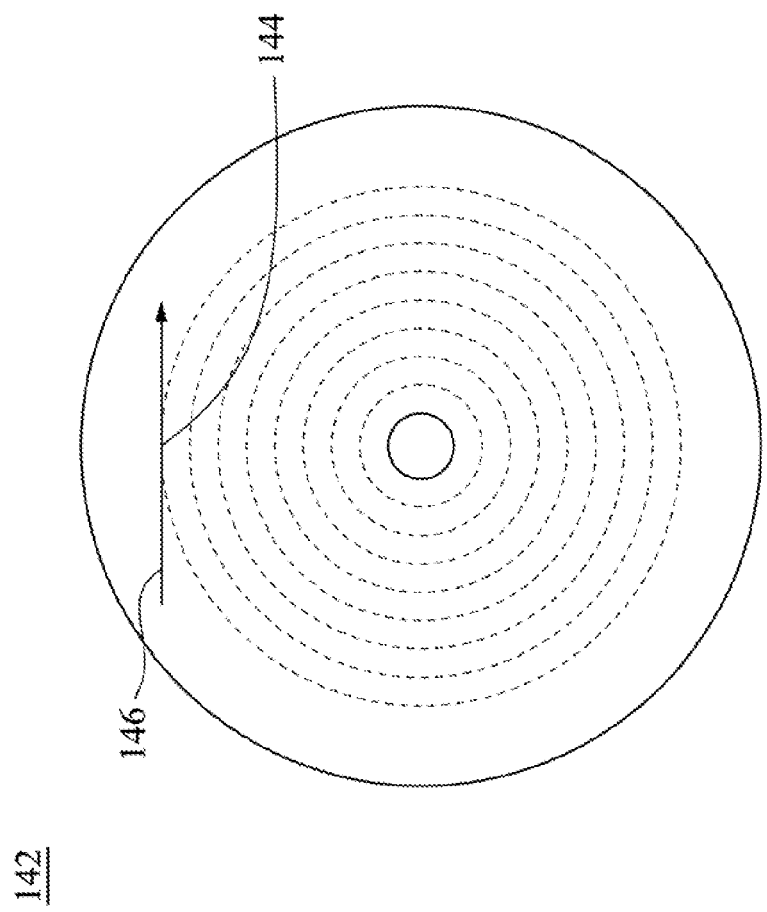
FIG. 4B is a top-view of an orientation layer illustrated in FIG. 4A.

FIG. 4A is a cross-sectional view of a holographic storage disk 120 according to the fourth embodiment of this invention. FIG. 4B is a top-view of an orientation layer 142 illustrated in FIG. 4A. The difference between the present embodiments and the first embodiment is that the holographic storage disk 120 further includes a liquid-crystal layer 140 and an orientation layer 142. The liquid-crystal layer 140 and the orientation layer 142 are disposed between the quarter-wave plate 136 and the photosensitive units 134 of the storage layer 128, in which the liquid-crystal layer 140 is present between the orientation layer 142 and the quarter-wave plate 136.

As described previously, under the rotating status of the holographic storage disk 120, the angle between the fast axis of the quarter-wave plate 136 and the direction of the polarization of the incident light varies with the rotation of the holographic storage disk 120, such that the quarter-wave plate 136 cannot provide the function that transferring the polarization from the linear polarization to the circular polarization under some conditions. In the present embodiment, by disposing the liquid-crystal layer 140 and the orientation layer 142, the angle between the fast axis of the quarter-wave plate 136 and the direction of the polarization of the incident light can be independent of the rotating status of the holographic storage disk 120.

Furthermore, as the holographic storage disk 120 is designed to be circular, the shape of the orientation layer 142 viewed in a direction normal to the orientation layer 142 is circular. The orientation layer 142 has orientation directions 144 arranged as concentric circles to allow at least one liquid crystal in the liquid-crystal layer 140 to be arranged along at least one tangent direction 146 of the concentric circles. Thus, the orientation directions 144 of the orientation layer 142 is shown to be concentric circles, as the dotted lines have illustrated in FIG. 4B.

Since the rotating direction of the liquid crystal in the liquid-crystal layer 140 may be affected by the orientation direction 144 of the orientation layer 142, as the orientation directions 144 of the orientation layer 142 are arranged in concentric circles, the liquid crystal in the liquid-crystal layer 140 has been arranged along the tangent direction 146 of the orientation layer 142 and the holographic storage disk 120. Therefore, with the liquid crystal in the liquid-crystal layer 140 arranged along the tangent direction 146, the angle between the fast axis of the quarter-wave plate 136 and the direction of the polarization of the incident light can be controlled. In addition, in some embodiments, the liquid-crystal layer 140 includes at least one of a thermotropic liquid crystal polymer and a lyotropic liquid crystal polymer, and the thickness of the liquid-crystal layer 140 can be varied according to the different incident angles.

Figure 5:
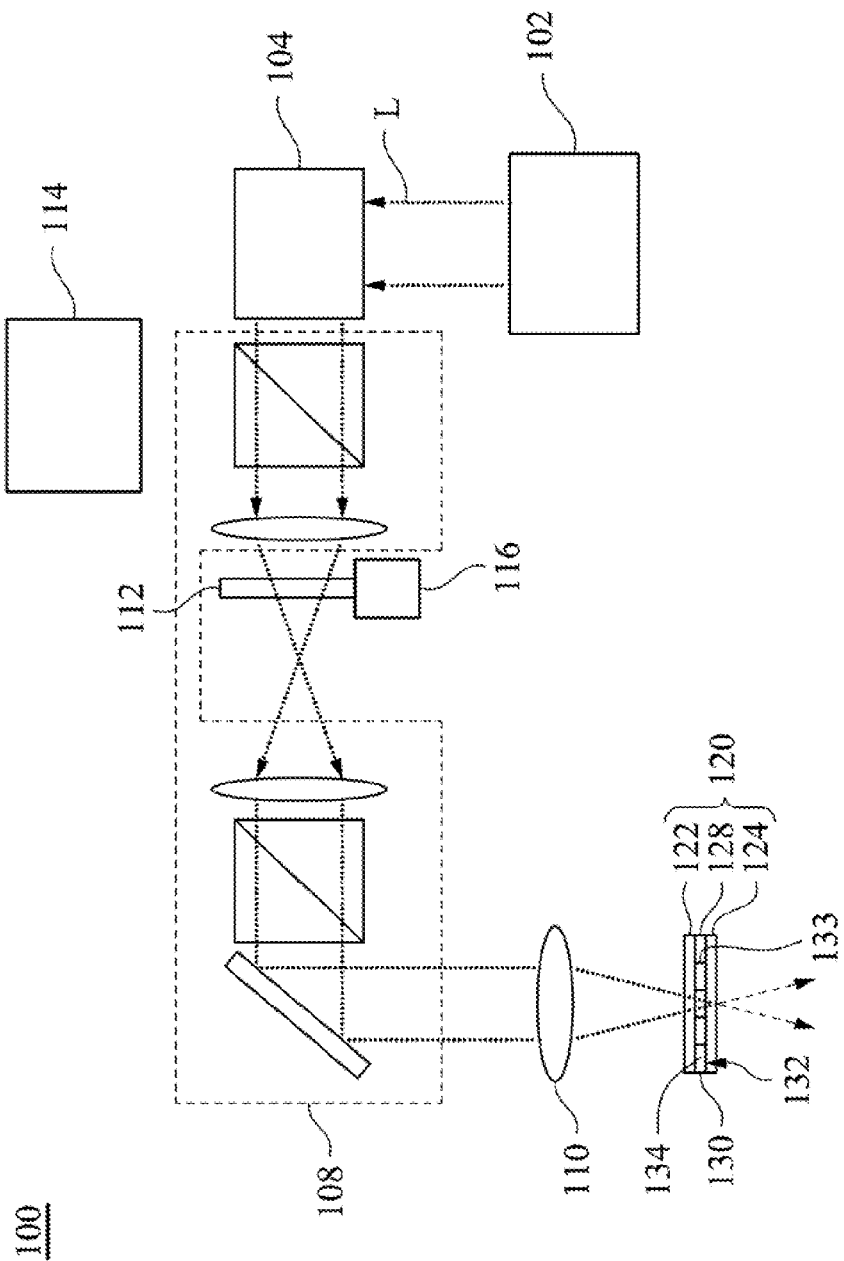
FIG. 5 is a configuration of a holographic storage system according to the fifth embodiment of this invention.

FIG. 5 is a configuration of a holographic storage system 100 according to the fifth embodiment of this invention. The difference between the present embodiment and the first embodiment is that the interference noise is eliminated by a filter 12 in the present embodiment, while the interference noise is eliminated by the quarter-wave plate 136 (see FIG. 1B) in the first embodiment.

As shown in FIG. 5, the holographic storage system 100 includes a holographic storage disk 120, a holographic light-source module 102, a spatial light modulator (SLM) 104, a light-splitting module 108, an object lens 110, a receiver 114, and a filter 112. As described above, the holographic storage disk 120 includes a storage layer 128, in which the storage layer 128 includes a reflection-structure layer 130 and photosensitive units 134. The reflection-structure layer 130 has cavities 132, in which the reflection-structure layer 130 is grid-shaped. The cavities 132 penetrate the reflection-structure layer 130. The photosensitive units 134 are disposed in the cavities 132.

FIG. 6A to FIG. 6D are top views of a storage layer 128 of a holographic storage disk 120 illustrated in FIG. 5 according to various embodiments of this invention. As described previously, since the writing light beam is confined by the cavities 132 of the reflection-structure layer 130, the extent of mixing between the signal light beam and the reference light beam is enhanced. Therefore, the usage rate of the photosensitive units 134 of the storage layer 128 is increased, and the storage capacity of the holographic storage disk 120 is improved.

As shown in FIGS. 6A-6D, in some embodiments, the shape and the boundaries of the cavities 132 of the reflection-structure layer 130 are arranged and defined by the sidewalls 133 of the reflection-structure layer 130. The reflection-structure layer 130 is grid-shaped, and the shape of the cavities 132 viewed in a direction normal to storage layer 128 and the reflection-structure layer 130 is circular, triangular, rectangular, or polygonal (illustrated in FIG. 6A, FIG. 6B, FIG. 6C, and FIG. 6D, respectively). In addition, the cavities 132 can be arranged in a closely packed configuration, thereby increasing the usage rate of the photosensitive units 134 and improving the storage capacity of the holographic storage disk 120.

Referring back to FIG. 5. The holographic light-source module 102 is configured to provide a signal light beam and a reference light beam. The SLM 104 is configured to receive the signal light beam and the reference light beam provided by the holographic light-source module 102 and to modulate the signal light beam and the reference light beam. The signal light beam and the reference light beam modulated by the SLM 104 are propagated toward the holographic storage disk 120 via the light-splitting module 108 and the object lens 110. The holographic storage system 100 illustrated in FIG. 5 is in the loading operation, in which the reference light beam provided by the holographic light-source module 102 is taken as the loading light beam L. The receiver 114 is configured to receive the loading light beam L leaving from the holographic storage disk 120. In other words, the receiver 114 can be disposed at a position corresponding to the optical path of the loading light beam L leaving from the holographic storage disk 120. In addition, the receiver 114 can be an optical-signal loading device.

Figure 6B:
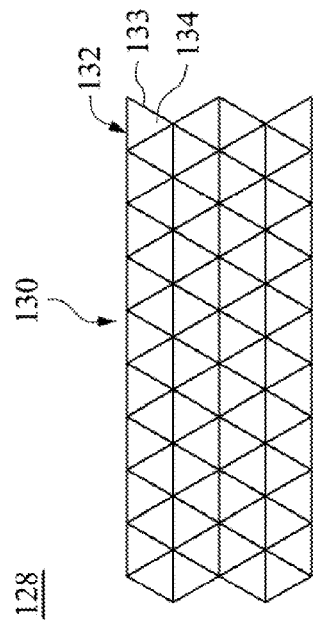
FIG. 6A to FIG. 6D are top views of a storage layer of a holographic storage disk illustrated in FIG. 5 according to various embodiments of this invention.
Figure 6D:
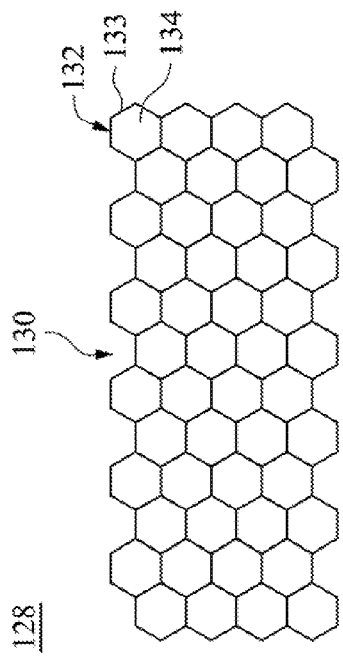
Figure 6A:
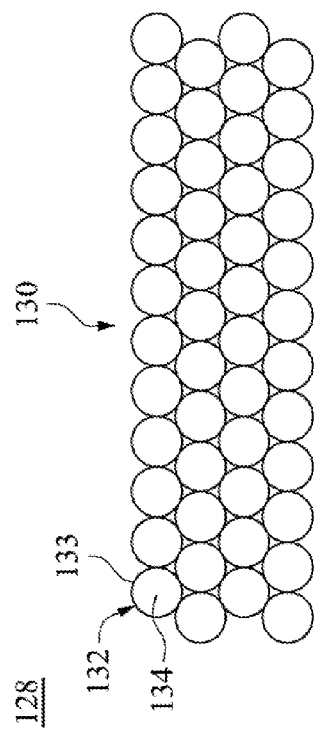
Figure 6C:
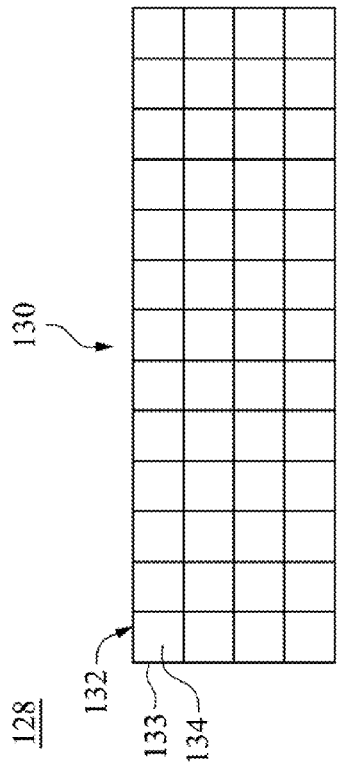
Figures 7A, 7B:
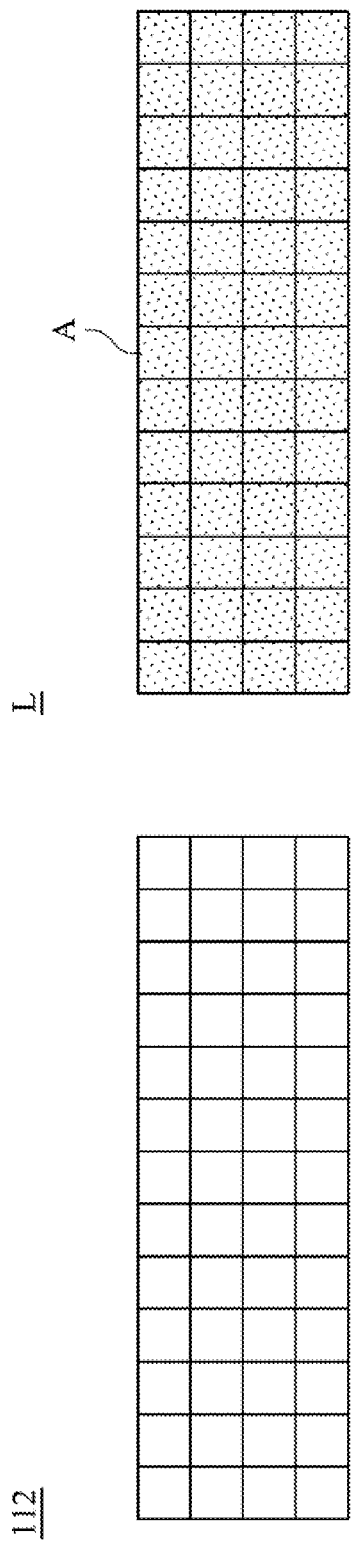
FIG. 7A is a front view of a filter facing the storage illustrated FIG. 6C.
FIG. 7B is a schematic diagram of an incident-surface illumination of a loading light beam which is blocked by the filter illustrated in FIG. 7A.

FIG. 7A is a front view of a filter 112 facing the storage layer 128 illustrated FIG. 6C. FIG. 7B is a schematic diagram of an incident-surface illumination of a loading light beam L which is blocked by the filter 112 illustrated in FIG. 7A. The following descriptions are provided with the grip-shape of the storage layer 128 illustrated in FIG. 6C.

The filter 112 is disposed at a position which is correspondingly present between the SLM 104 and the objective lens 110 in the optical path of the loading light beam L (the same as the optical path of the reference light beam). The filter 112 is grid-shaped, and each of the grids of the filter 112 and each of the grids of the reflection-structure layer 130 have the same shape. For example, in the present embodiment, as the grid-shape of the reflection-structure layer 130 is arranged as the rectangular cavities 132 illustrated in FIG. 6C, the grid-shape of the reflection-structure layer 130 is correspondingly rectangular, as shown in FIG. 7A. In FIG. 7A, the filter 112 is grid-shaped, and each of the grid-shape of the filter 112 is rectangular.

With this configuration, when the loading light beam L passes through the filter 112, a part of the loading light beam L may be blocked by the filter 112, as shown in FIG. 7B. In FIG. 7B, the region illustrated by the black lines represents the loading light beam L which is blocked by the filter 112, and the regions with the black dots represent the loading light beam L which is not blocked by the filter 112.

When the part of the loading light beam L is blocked by the filter 112, this part of the loading light beam L will not reach the holographic storage disk 120. Thus, the loading light beam L which may reach the boundary of the grid-shape of the reflection-structure layer 130 (or reach the sidewalls 133 of the reflection-structure layer 130) is blocked by the filter 112. In other words, an incident surface of the loading light beam L passing through the filter 112 may have a block zone A, as the indicated by the black lines in FIG. 7B. The boundary of the block zone A is defined by the boundary of the gird-shape of the filter 112 and corresponds to the grid-shape of the reflection-structure layer 130 illustrated in FIG. 6C.

In addition, when the filter 112 is disposed at the different positions, the position where the loading light beam L is blocked by the filter 112 is different correspondingly. Thus, with the different positions where the loading light beam L is blocked by the filter 112, the size of the blocked loading light beam L imaged by the light-splitting module 108 and the object lens 110 is varied. In other words, with adjusting the position of the filter 112, an area of the block zone A of the loading light beam L reaching the holographic storage disk 120 can be adjusted.

In some embodiments, the position of the filter 112 makes the area of the block zone A is in a range from one half to double of the area of the grid-shape of the reflection-structure layer 130. Herein, the term "the ratio of the area of the block zone A to the area of the grid-shape of the reflection-structure layer 130" means that the ratio of the area of the black lines in FIG. 6C and the black lines in FIG. 7B. For example, as the area of the block zone A is 1.5 times of the area of the grid-shape of the reflection-structure layer 130, the area of the blocked loading light beam L is greater than the area of the boundary of the grid-shape of the reflection-structure layer 130 (equal to the area of the sidewalls 133 viewed along the direction normal to the surface of the storage layer 128). Moreover, under the area ratio is adjustable, the storage layer 128 of the reflection-structure layer 130 is within flexible allowable-manufacturing tolerances with respect to the loading light beam L.

Furthermore, since the loading light beam L blocked by the filter 112 may reflect from the filter 112, the loading light beam L reflected from filter 112 may become the noise. In order to prevent the loading light beam form being the noise, the filter 112 can be made of a light absorbing material, such that the loading light beam L blocked by the filter 112 may be absorbed by the filter 112.

In addition, during the loading operation of the holographic storage disk 120, the rotating status of the holographic storage disk 120 may change the relative position between the elements due to the vibration. For example, the relative position between the SLM 104 and the filter 112 may be changed. In order to make the filter 112 able to be moved to each corresponding point of the rotating status of the holographic storage disk 120 and able to be kept to aim at the grid-shape of the reflection-structure layer 130, the holographic storage system 100 further includes an actuator 116 connected to the filter 112. The actuator 116 may be a micro motor, a voice coil motor, or a linear motor.

As described previously, the position of the receiver 114 of the present embodiment can be adjusted according to the optical path of the loading light beam L (the same as the optical path of the reference light beam) reflected form the holographic storage disk 120, in which the optical path of the loading light beam L reflected from the holographic storage disk 120 is corresponding to the structure of the holographic storage disk 120. In some embodiments, the holographic storage disk 120 further includes a first substrate 122 and a second substrate 124. The storage layer 128 is present between the first substrate 122 and the second substrate 124. The first substrate 122 and the object lens 110 are present at the same side of the storage layer 128.

With this configuration, each of the first substrate 122 and the second substrate 124 can be a transparent substrate. In other embodiments, the first substrate 122 is a transparent substrate, and the second substrate 124 is a reflective substrate. A person having ordinary skill in the art may choose a proper position of the receiver 114 according to the structure of the holographic storage disk 120, so as to receive the diffracting light reflected from the holographic storage disk 120.

As described above, in the present embodiment, since the loading light beam L which may reach the sidewalls 133 at the surface of the holographic storage disk 120 is blocked by the filter 112 the generation of the interference noise is prevented, thereby eliminating the interference noise caused by the scattered light beams with respect to the receiver 114.

Figure 8:
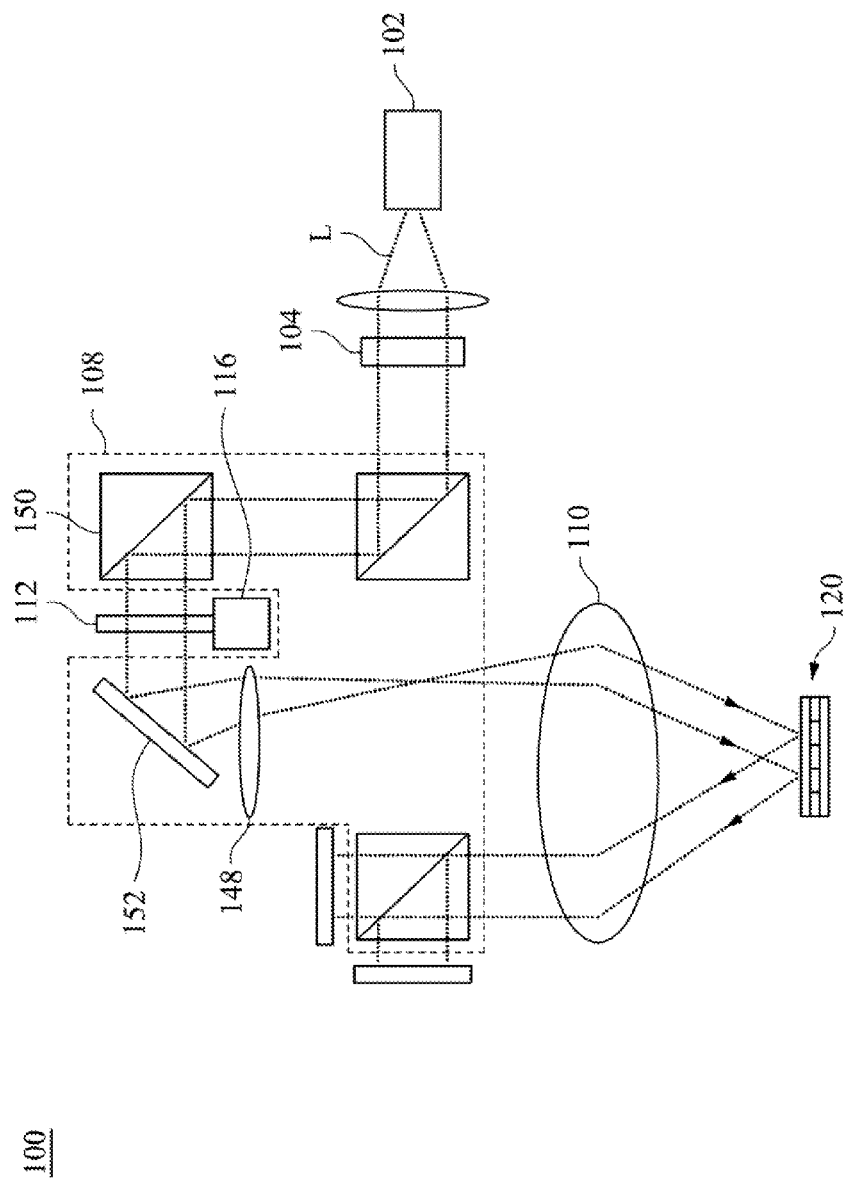
FIG. 8 is a configuration of a holographic storage system according to the sixth embodiment of this invention.

FIG. 8 is a configuration of a holographic storage system 100 according to the sixth embodiment of this invention. The difference between the present embodiment and the fifth embodiments is that the holographic storage system 100 of the present embodiment is a monocular system, while the holographic storage system 100 of the fifth embodiment is a coaxial system. Similarly, the holographic storage system 100 illustrated in FIG. 8 is in the loading operation, in which the reference light beam provided by the holographic light-source module 102 is taken as the loading light beam L.

In the monocular system, the loading light beam L entering the holographic storage disk 120 and the diffracting light D leaving the holographic storage disk 120 may not travel along the same optical path. Thus, the optical path of the loading light beam L is independent of the optical path of the diffracting light D. In other words, the filter 112 can be disposed at a position in the optical path of the loading light beam L or the optical path of the diffracting light D, in which the filter 112 corresponds to an optical conjugate position of the holographic storage disk 120. In the present embodiment, the filter 112 is disposed at a position corresponding to the optical conjugate position of the holographic storage disk 120 facing a surface of the object lens 110.

As shown in FIG. 8, the filter 112 can be disposed in the optical path of the loading light beam L. Thus, the filter 112 is disposed at a position which is correspondingly present between the SLM 104 and the object lens 110 in the optical path of the loading light beam L (the same as the optical path of the reference light beam), so as to correspond with the position of the real image of the holographic storage disk 120. In the light-splitting module 108, according to the different optical-path designs, the position of the real image of the holographic storage disk 120 may be present between a lens 148 and a light splitter 150 or present between a mirror 152 and the light splitter 150, such that the filter 112 can be disposed to correspond with the position of the real image of the holographic storage disk 120. For example, in the present embodiment, the filter 112 is disposed between the mirror 152 and the light splitter 150, so as to correspond with the optical conjugate position of the holographic storage disk 120. Similarly, in order to make the filter 112 able to be moved correspondingly to the rotating status of the holographic storage disk 120 and able to be kept to aim at the grid-shape of the reflection-structure layer 130, the actuator 116 can be connected to the filter 112.

Figure 9:
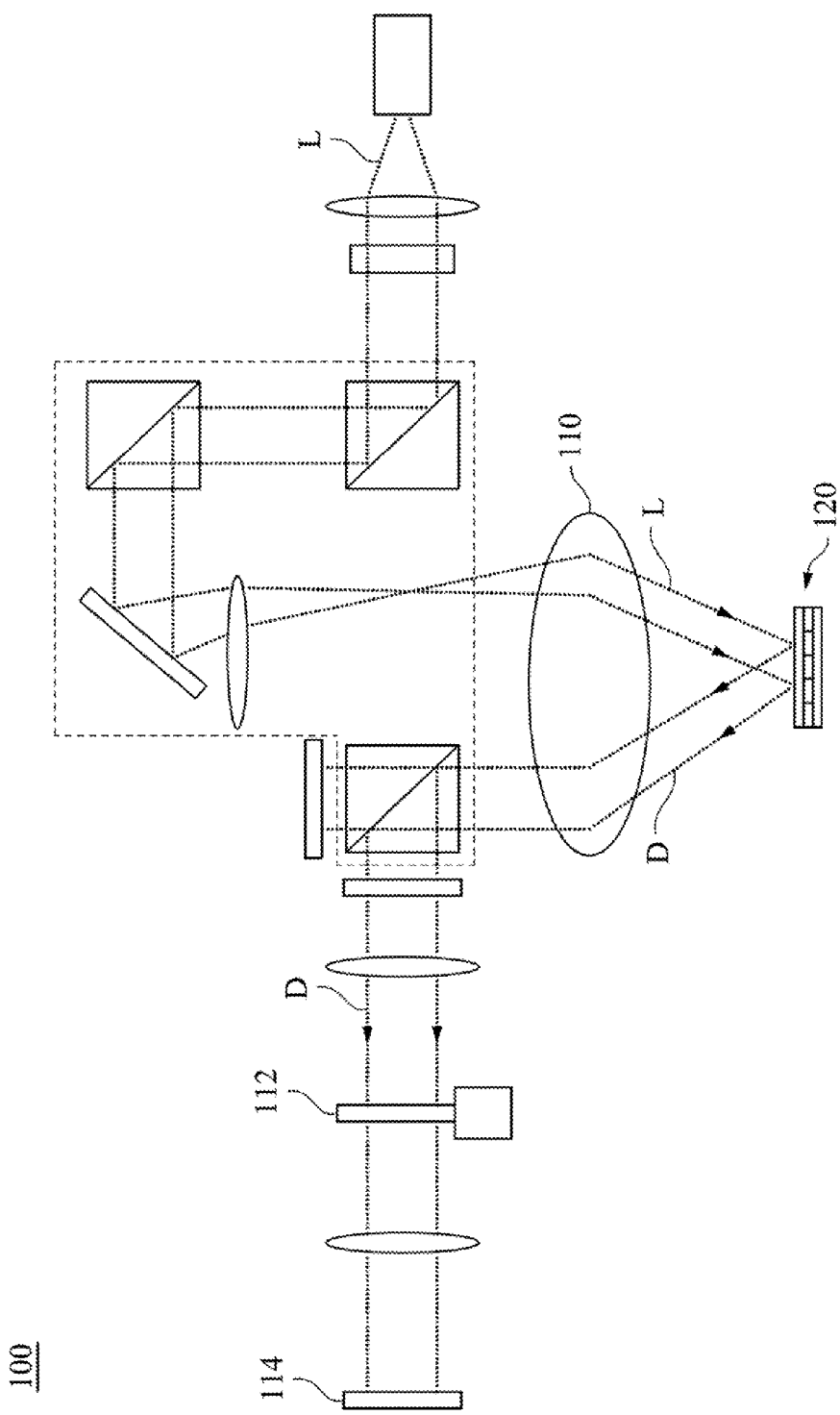
FIG. 9 is a configuration of a holographic storage system according to the seventh embodiment of this invention.

FIG. 9 is a configuration of a holographic storage system 100 according to the seventh embodiment of this invention. The difference between the present embodiment and the sixth embodiment is that the filter 112 of the present embodiment is disposed in the optical path of the diffracting light D, while the filter 112 of the sixth embodiment is disposed in the optical path of the loading light beam L. As shown in FIG. 9, the filter 112 is disposed at a position which is correspondingly present between the holographic storage disk 120 and the receiver 114 in the optical path of the diffracting light D (the same as the optical path of the reference light beam). Similarly, the filter 112 is disposed to correspond to the position of the real image or the optical conjugate position of the holographic storage disk 120.

Figure 10A:
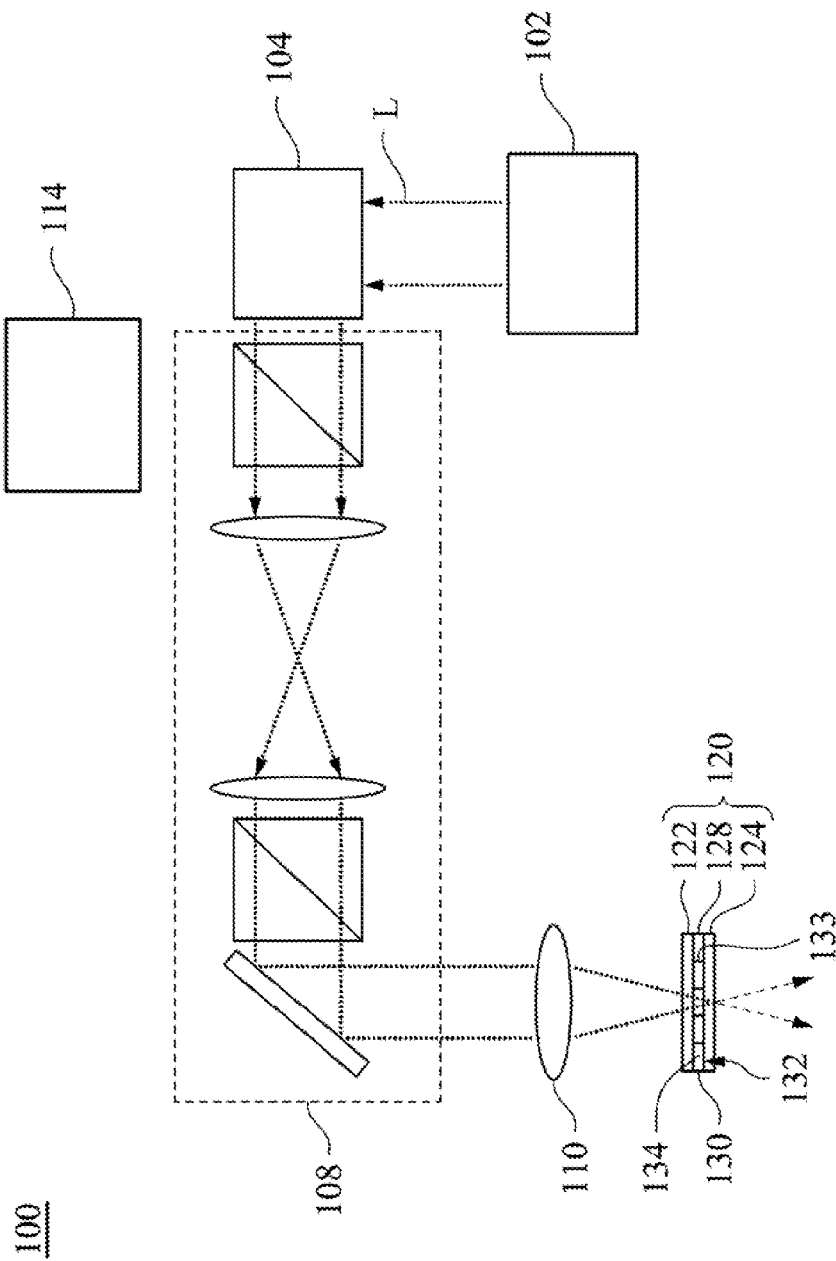
FIG. 10A is a configuration of a holographic storage system according to the eighth embodiment of this invention.

FIG. 10A is a configuration of a holographic storage system 100 according to the eighth embodiment of this invention. FIG. 10B is a front view of a SLM 104 illustrated in FIG. 10A. The difference between the present embodiment and one of the fifth to the seventh embodiments is that the interference noise is eliminated by the surface structure of the SLM 104 in the present embodiment, while the noise is eliminated by the filter 112 (see FIGS. 5, 8, and 9) in one of the fifth to the seventh embodiments.

The holographic storage system 100 includes a holographic storage disk 120, a holographic light-source module 102, an SLM 104, a light-splitting module 108, and an object lens 110. As described previously, the holographic storage disk 120 includes a storage layer 128, in which the storage layer 128 includes a reflection-structure layer 100 and photosensitive units 134. The reflection-structure layer 130 has cavities 132. The reflection-structure layer 130 is grid-shaped, and the cavities 132 penetrate the reflection-structure layer 130. The photosensitive units 134 are disposed in the cavities 132. Furthermore, the grid-shape of the reflection-structure layer 130 can be arranged as the grid-shape illustrated in FIGS. 6A to 6D.

The holographic light-source module 102 is configured to provide a signal light beam and a reference light beam. The SLM 104 is configured to receive the signal light beam and the reference light beam provided by the holographic light-source module 102 and to modulate the signal light beam and the reference light beam. The signal light beam and the reference light beam modulated by the SLM 104 are propagated toward the holographic storage disk 120 via the light-splitting module 108 and the object lens 110. The receiver 114 is configured to receive the diffracting light leaving from the holographic storage disk 120. The holographic storage system 100 illustrated in FIG. 10A is in the loading operation, in which the reference light beam provided by the holographic light-source module 102 is taken as the loading light beam L.

in the present embodiment, the SLM 104 has a block pattern 106, as shown in FIG. 10B. The block pattern 106 is configured to block the modulated reference light beam (or the loading light beam L) to allow an incident surface of the modulated reference light beam to be grid-shaped. Each of the grids of the reference light beam and each of the grids of the reflection-structure layer 130 have the same shape. In other words, in the holographic storage system 100 according to one of the fifth to the seventh embodiments, the incident surface of the reference light beam having a grid-shape is formed through the filter 112 having a grid-shape (see FIGS. 5, 8 and 9). In the present embodiment, the incident surface of the reference light beam having a grid-shape is formed through the surface structure of the SLM 104. Therefore, the reference light beam which may reach the grid-shaped boundary of the reflection-structure layer 130 (thus, the sidewalls 133) can be blocked by the block pattern 106 of the SLM 104, thereby reducing the noise caused by the scattering light with respect to the receiver 114.

Similar to the fifth embodiment, the reference light beam is modulated to have the block zone, in which the boundary of the block zone is corresponding to the grid-shape of the reflection-structure layer 130. The position of the SLM 104 can make an area of the block zone be in a range from one half to double of the area of the grid-shape of the reflection-structure layer 130. Furthermore, the holographic storage disk 120 further includes a first substrate 122 and a second substrate 124. In some embodiments, each of the first substrate 122 and the second substrate 124 is a transparent substrate. Alternatively, the first substrate 122 is a transparent substrate and the second substrate 124 is a reflective substrate. The configuration of the first substrate 122 and the second substrate 124 can be similar to the fifth embodiment.

As a result, the storage layer of the holographic storage disk of the present invention includes the reflection-structure layer, in which the reflection-structure layer includes the cavities for confining the area with respect to the writing light beam. When the holographic storage disk is in the writing operation, the interference and exposure occurring by the application of a writing light beam is confined in this area, such that the extent of mixing between the reference light beam and the signal light beam is enhanced. Therefore, with the cavities for confining the area with respect to the writing light beam, the usage rate of the photosensitive material disposed in the storage layer may be increased, and the storage capacity of the holographic storage disk may also be improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A holographic storage disk, comprising:
a reflective layer;
a storage layer disposed on the reflective layer and comprising:
a reflection-structure layer having a plurality of cavities, wherein the reflection-structure layer is grid-shaped, and the cavities penetrate the reflection-structure layer; and
a plurality of photosensitive units disposed in the cavities; and
a quarter-wave plate disposed between the reflective layer and the photosensitive units.

2. The holographic storage disk of claim 1, the quarter-wave plate is present between the reflective layer and the reflection-structure layer.

3. The holographic storage disk of claim 1, wherein the quarter-wave plate is present in the cavities of the reflection-structure layer.

4. The holographic storage disk of claim 1, further comprising an azo-dye layer disposed between the quarter-wave plate and the photosensitive units, wherein the azo-dye layer is opposite to the reflective layer.

5. The holographic storage disk of claim 1, further comprising a liquid-crystal layer and an orientation layer which are disposed between the quarter-wave plate and the photosensitive units, wherein the liquid-crystal layer is present between the orientation layer and the quarter-wave plate.

6. The holographic storage disk of claim 5, wherein a shape of the orientation layer viewed in a direction normal to the orientation layer is circular, and the orientation layer has orientation directions arranged as concentric circles to allow at least one liquid crystal in the liquid-crystal layer to be arranged along at least one tangent direction of the concentric circles.

7. The holographic storage disk of claim 5, wherein the liquid-crystal layer comprises at least one of a thermotropic liquid crystal polymer and a lyotropic liquid crystal polymer.

8. A holographic storage system, comprising:
a holographic storage disk comprising a storage layer, wherein the storage layer comprises:
a reflection-structure layer having a plurality of cavities, wherein the reflection-structure layer is grid-shaped, and the cavities penetrate the reflection-structure layer; and
a plurality of photosensitive units disposed in the cavities; and
a holographic light-source module configured to provide a signal light beam and a reference light beam;
a spatial light modulator (SLM) configured to receive the signal light beam and the reference light beam provided by the holographic light-source module and to modulate the signal light beam and the reference light beam;
a light-splitting module;
an object lens, wherein the signal light beam and the reference light beam modulated by the SLM are propagated toward the holographic storage disk via the light-splitting module and the object lens;
a receiver configured to receive the reference light beam reflected form the holographic storage disk; and
a filter disposed in an optical path of the reference light beam, wherein the filter is grid-shaped, and each of the grids of the filter and each of the grids of the reflection-structure layer have the same shape.

9. The holographic storage system of claim 8, wherein the filter is made of a light absorbing material.

10. The holographic storage system of claim 8, wherein the filter is disposed at a position corresponding to an optical conjugate position of the holographic storage disk facing a surface of the object lens.

11. The holographic storage system of claim 8, further comprising an actuator connected to the filter.

12. The holographic storage system of claim 8, wherein the filter is disposed at a position which is correspondingly present between the SLM and the objective lens in the optical path of the reference light beam.

13. The holographic storage system of claim 8, wherein the filter is disposed at a position which is correspondingly present between the holographic storage disk and the receiver in the optical path of the reference light beam.

14. The holographic storage system of claim 8, wherein an incident surface of the reference light beam passing through the filter has a block zone, the boundary of the block zone corresponds to the grid-shape of the reflection-structure layer, and the position of the filter makes an area of the block zone be in a range from one half to double of the area of the grid-shape of the reflection-structure layer.

15. The holographic storage system of claim 8, wherein the holographic storage disk further comprises a first substrate and a second substrate, the storage layer is present between the first substrate and the second substrate, the first substrate and the object lens are present at the same side of the storage layer, and each of the first substrate and the second substrate is a transparent substrate.

16. The holographic storage system of claim 8, wherein the holographic storage disk further comprises a first substrate and a second substrate, the storage layer is present between the first substrate and the second substrate, the first substrate and the object lens are present at the same side of the storage layer, wherein the first substrate is a transparent substrate, and the second substrate is a reflective substrate.

17. A holographic storage system, comprising:
   a holographic storage disk comprising a storage layer, wherein the storage layer comprises:
      a reflection-structure layer having a plurality of cavities, wherein the reflection-structure layer is grid-shaped, and the cavities penetrate the reflection-structure layer, and
      a plurality of photosensitive units disposed in the cavities; and
   a holographic light-source module configured to provide a signal light beam and a reference light beam;
   a spatial light modulator (SLM) configured to receive the signal light beam and the reference light beam provided by the holographic light-source module and to modulate the signal light beam and the reference light beam, wherein the SLM has a block pattern configured to block the modulated reference light beam to allow an incident surface of the modulated reference light beam to be grid-shaped, and each of the grids of the reference light beam and each of the grids of the reflection-structure layer have the same shape;
   a light-splitting module; and
   an object lens, wherein the signal light beam and the reference light beam modulated by the SLM are propagated toward the holographic storage disk via the light-splitting module and the object lens.

18. The holographic storage system of claim 17, wherein the reference light beam is modulated to have a block zone, the boundary of the block zone is corresponding to the grid-shape of the reflection-structure layer, and the position of the SLM makes an area of the block zone be in a range from one half to double of the area of the grid-shape of the reflection-structure layer.

19. The holographic storage system of claim 17, wherein the holographic storage disk further comprises a first substrate and a second substrate, the storage layer is present between the first substrate and the second substrate, the first substrate and the object lens are present at the same side of the storage layer, and each of the first substrate and the second substrate is a transparent substrate.

20. The holographic storage system of claim 17, wherein the holographic storage disk further comprises a first substrate and a second substrate, the storage layer is present between the first substrate and the second substrate, the first substrate and the object lens are present at the same side of the storage layer, wherein the first substrate is a transparent substrate, and the second substrate is a reflective substrate.

* * * * *